Figure 3:
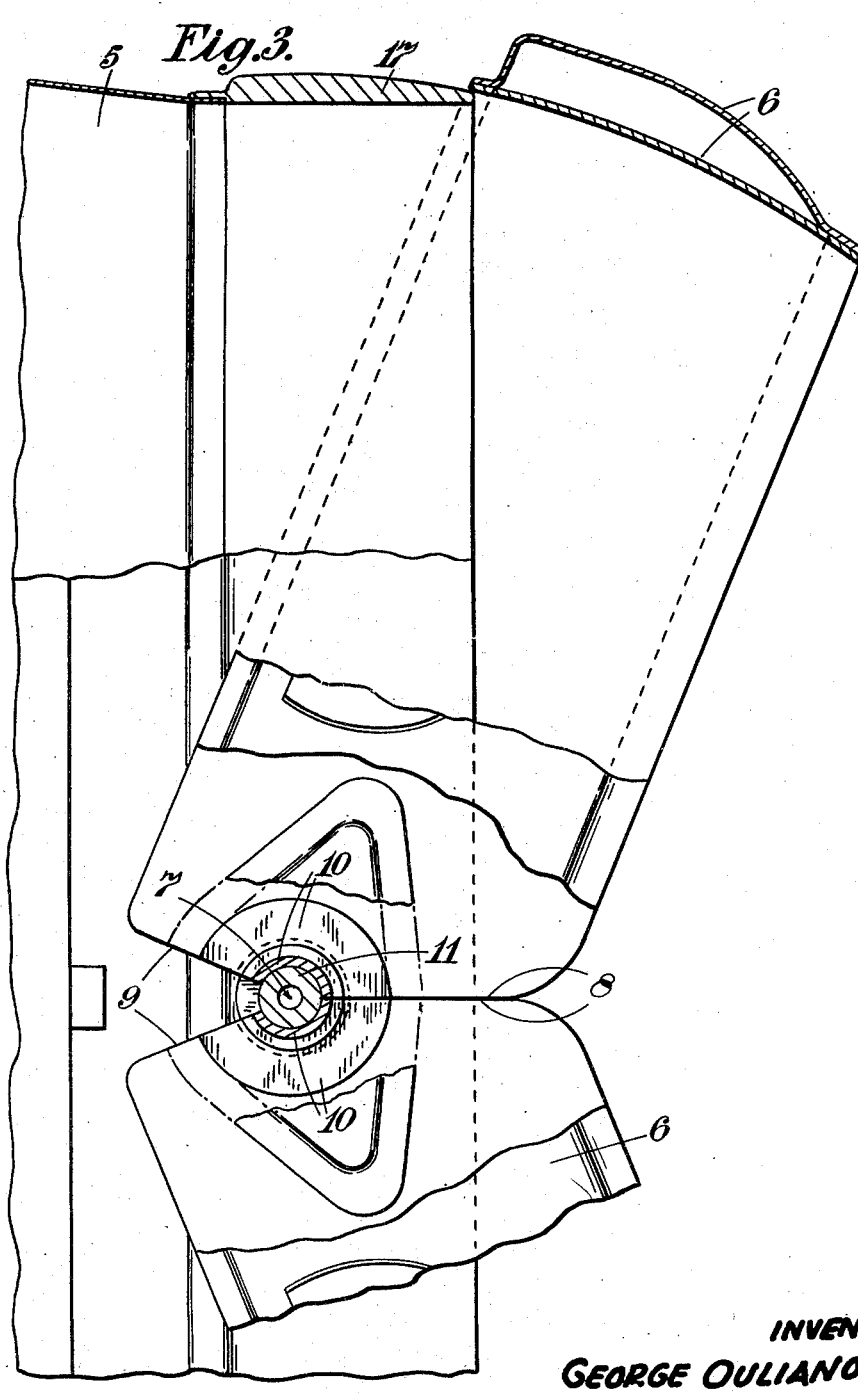

Sept. 26, 1950 G. OULIANOFF 2,523,842
ADJUSTABLE JET NOZZLE FOR JET PROPULSION UNITS
Filed Aug. 15, 1946 3 Sheets-Sheet 1
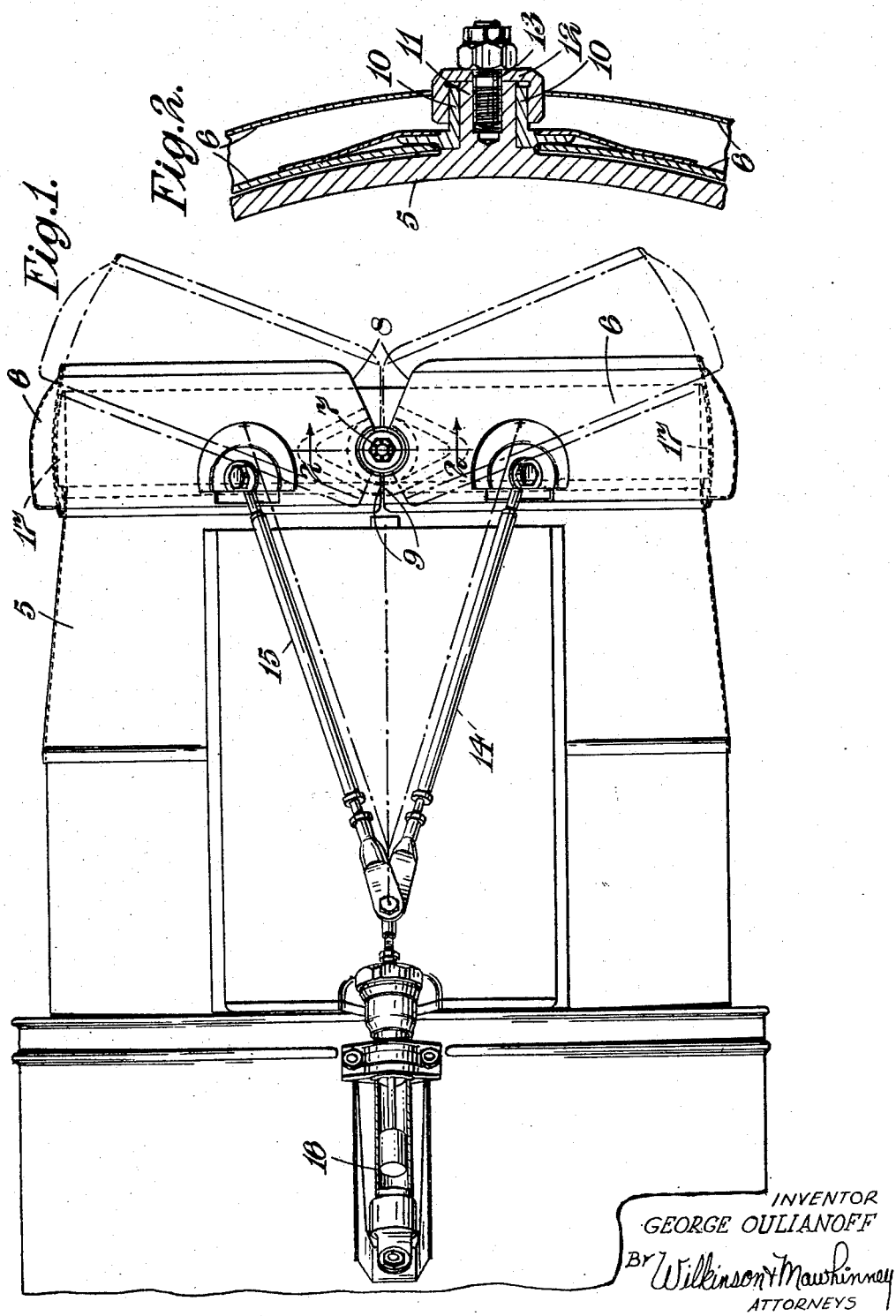
INVENTOR
GEORGE OULIANOFF
BY Wilkinson & Mawhinney
ATTORNEYS Sept. 26, 1950 G. OULIANOFF 2,523,842
ADJUSTABLE JET NOZZLE FOR JET PROPULSION UNITS
Filed Aug. 15, 1946 3 Sheets-Sheet 2

INVENTOR
GEORGE OULIANOFF
by Wilkinson Mawhinney
Attys.

Sept. 26, 1950  G. OULIANOFF  2,523,842
ADJUSTABLE JET NOZZLE FOR JET PROPULSION UNITS
Filed Aug. 15, 1946  3 Sheets-Sheet 3
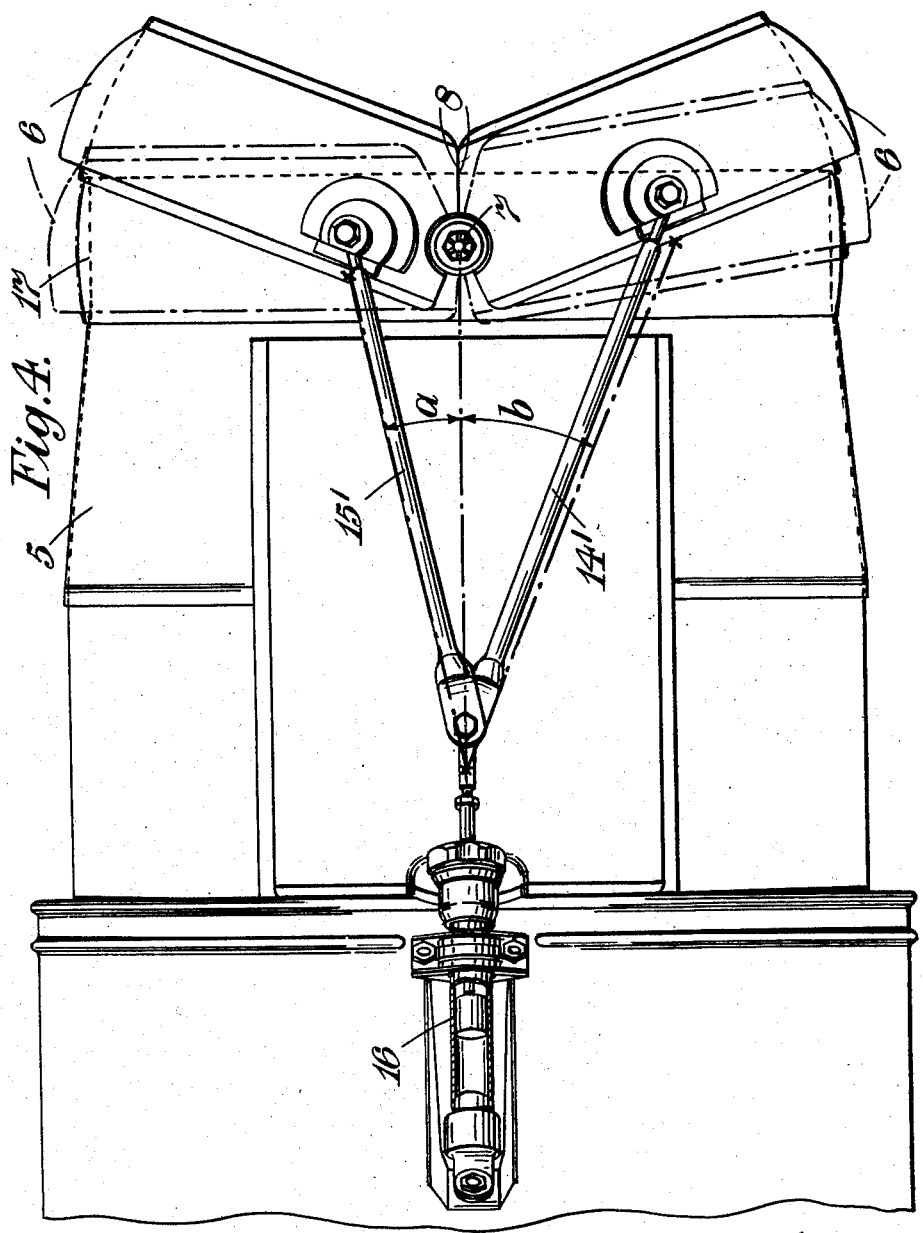
INVENTOR
GEORGE OULIANOFF Patented Sept. 26, 1950

2,523,842

UNITED STATES PATENT OFFICE 2,523,842

ADJUSTABLE JET NOZZLE FOR JET PROPULSION UNITS

George Oulianoff, Rimington, near Clitheroe, England, assignor to Rolls-Royce Limited, Derby, England, a British company Application August 15, 1946, Serial No. 690,747
In Great Britain March 8, 1945

3 Claims. (Cl. 60—35.55)

1

This invention relates to jet-nozzles for jet-propulsion units such, for example, as are used on aircraft, and has for its object to provide an improved construction which, whilst satisfying the operating requirements, will be simple and of light weight.

In the layout usually adopted in aircraft, the jet occupies a position at the extreme rear end of the aircraft where weight is very critical, so that a construction of jet which is light is particularly advantageous.

According to this invention there is provided in combination with a jet-pipe, a nozzle which comprises a pair of nozzle-segments each of which is shaped internally as a half zone of a sphere, and is pivoted to swing about a diameter of the sphere. The spherical shaping of the inner surface of the nozzle segments ensures that the resultant of the internal gas pressure on each segment acts radially to the sphere, and therefore to the axis of pivoting so that it does not produce any turning moment on the segments tending to displace them from the positions in which they are set, or in other words the movable segments are balanced as regards gas pressure and the only force which opposes their adjusting movement is the drag due to skin friction which is of minor importance. The operating mechanism can therefore be kept light, and moreover the fact that the gas pressures are balanced enables the whole structure of the variable nozzle to be kept to a minimum weight.

According to another feature of the invention the end of the jet-pipe on which the segments are pivoted, is enclosed by the segments and is of similar spherical formation, thereby providing a simple seal for the gases.

According to another feature of this invention the adjusting mechanism for the segments comprises a simple linkage connected to each of them, such link being operated by hydraulic or other power means giving a linear movement. In the preferred construction there is provided at each side of the jet-pipe a linearly movable member which is coupled by links to the two segments to provide direct operation thereof.

According to another feature of the invention, the two segments are pivoted to swing about a horizontal axis, and the upper segment is arranged to be opened wider than the lower segment, thereby inclining the axis of the nozzle upwards from the axis of the jet-pipe. This overcomes the well-known difficulty in connection with jet-propelled aircraft in which, owing to the absence of slipstream over the rear horizontal controlling surfaces, there is difficulty in keeping the tail of the machine down during take-off.

The operating linkage of the variable nozzle may be arranged so that this inclination of the nozzle-axis is effected automatically when the nozzle is opened to its maximum area, which will always be required at take-off, or alternatively a special adjustment of the linkage may be made for the purpose of take-off, so that the maximum area is available in normal flight without any tilting of the nozzle-axis relatively to the jet-pipe axis.

Two specific embodiments of the present invention will now be described by way of example with reference to the accompanying drawings whereof, Figure 1 is a diagrammatic side elevation of a jet-pipe in accordance with the present invention, Figure 2 is a section on the line 2—2 of Figure 1 showing a detail thereof to an enlarged scale, Figure 3 is a fragmentary side elevational view, with parts broken away and parts shown in section illustrating the part-spherically curved end of the jet nozzle and the similarly formed parts of the adjustable segments, and Figure 4 is a modification of the arrangement shown in Figures 1–3, the view of Figure 4 corresponding to Figure 1.

As shown in Figures 1–3, the jet-pipe 5 at its rear extremity carries two nozzle segments 6 which are pivotally mounted on the same axis 7, the adjacent ends of the segments being tapered as at 8 and 9 to permit their relative angular movement. Each segment 6 is provided with hollow trunnion pins 10 (see Figure 2) engaging a pivot pin 11 carried by the jet-pipe 5 the trunnion pins 10 being each of less than 180° circumferential extent. The trunnion pins 10 are held in engagement with the pivot pin 11 by a cap 12 which is maintained in position upon the pin 11 by means of a bolt 13.

The segments 6 are of a width or axial dimension such that the axis 7, which is a diameter of the spherical internal shaping 17 of jet-pipe 5 lies within said width so as to maintain a circumferential seal when the segments are tilted to provide the minimum area of nozzle.

In Figure 1 the segments 6 are shown in full lines in the position which they assume when the nozzle is of maximum area and in chain dotted lines in the position to which the segments are adjusted to reduce the area to a minimum. In Figure 3 the segments 6 are shown in the positions they occupy when adjusted to reduce the area of the nozzle to a minimum.

The segments are connected to a hydraulic ram 16 by links 14, 15 the arrangement being that the ram 16 is controlled as described in the specification to patent application No. 693,444 filed August 28, 1946, so as to adjust said segments and therefore vary the area of the nozzle. It is to be understood that the linkage 14, 15 and the hydraulic ram 16 are provided at each side of the jet-pipe the hydraulic rams being interconnected so that they are simultaneously operated.

Referring now to Figure 4, there is illustrated an alternative arrangement according to this invention in which the two segments 6 are pivoted to swing about a horizontal axis and the upper segment is arranged to be opened wider than the lower segment when the hydraulic ram 16 is brought into operation to increase the nozzle area by moving the segments 6 from the minimum nozzle area position (full lines) to the maximum nozzle area position (chain lines). In this way in the maximum area position of the segments 6 the axis of the nozzle is inclined upwards from the axis of the jet-pipe 5 and this overcomes the well-known difficulty associated with jet propelled aircraft in which owing to the absence of slipstream over the rear horizontal controlling surfaces of the aircraft there is difficulty in keeping the tail of the machine down during take-off. Such differential adjustment of the nozzle segments may be effected, for instance, by disposing the link 15' connecting the upper segment to the ram 16 at a smaller angle $a$ to the long axis of the jet-pipe 5 than the link 14' which is inclined at an angle $b$ with respect to said axis and which connects the lower segment to the ram 16.

I claim:

1. In a jet propulsion device for aircraft the combination of a jet pipe; an end shaping on the outlet end of said jet pipe; two nozzle segments each of part-spherical internal form to co-operate in gas sealing engagement with the external surface of said end shaping; a pivotal mounting for said nozzle segments permitting them to swing about a diameter of said part-spherical formation; means for effecting the swinging of said segments on the pivotal mounting to vary the exit nozzle area defined between the internal surfaces of said segments; abutment means limiting the swinging movement of said segments in the sense of reducing the exit nozzle area, whilst maintaining the gas sealing co-operation between the internal part-spherical formation of the segments and the external surface of said end shaping; and abutment means limiting the swinging movement of said segments in the sense of increasing the nozzle area, whereby the maximum exit nozzle area is afforded when the nozzle defining surfaces of said segments lie substantially in the transverse plane of said end shaping.

2. In a jet propulsion device for aircraft, the combination of a jet pipe, a fixed nozzle end shaping on said jet pipe defining the minimum fixed restriction in said jet pipe, two nozzle segments of part spherical internal form co-operating in gas sealing engagement with the external surface of said end shaping, a pivotal mounting for said nozzle segments to permit them to swing about a diameter of said part spherical formation; means for effecting the swinging of the segments on the pivotal mounting to vary the exit nozzle area defined between surfaces of said segments; abutment means limiting the swinging movement of said segments in the sense of reducing the exit nozzle area from that defined by said end nozzle shaping, whilst maintaining the gas sealing co-operation between the internal part-spherical formation of the segments and the external surface of the end shaping; and abutment means limiting the swinging movement of said segments in the sense of increasing the nozzle area, whereby the maximum exit nozzle area is defined by said nozzle end shaping and the nozzle defining surfaces of said segments lie substantially in the transverse plane of said end shaping.

3. In a jet propulsion device for aircraft the combination of a jet pipe, an end shaping on the outlet end of jet pipe, which end shaping is internally of cylindrical form and of diameter equal to that of the jet pipe at the outlet end of the pipe, and is externally of part-spherical form; two nozzle segments of internal part-spherical form co-operating in gas sealing engagement with the external part-spherical surface of said end shaping; a pivotal mounting for said nozzle segments to permit them to swing about a diameter of said part-spherical formations; means for effecting the swinging of said segments on the pivotal mounting to vary the exit nozzle area defined between surfaces of said segments; abutment means limiting the swinging movement of said segments in the sense of reducing the exit nozzle area, whilst maintaining gas sealing co-operation between the part-spherical formations on said segments and said end shaping; and abutment means limiting the swinging movement of said segments in the sense of increasing the nozzle area, whereby the maximum exit nozzle area is afforded when the nozzle area defining surfaces of said segments lie substantially in the transverse plane of said end shaping.

GEORGE OULIANOFF.

REFERENCES CITED

The following references are of record in the file of this patent:

UNITED STATES PATENTS

| Number | Name | Date |
|---|---|---|
| 1,392,831 | Kitchen | Oct. 4, 1921 |
| 1,572,812 | Rees | Feb. 9, 1926 |
| 2,411,895 | Poole | Dec. 3, 1946 |